United States Patent [19]

Langlie et al.

[11] 4,224,786
[45] Sep. 30, 1980

[54] HAND TOOL WITH READILY DETACHABLE HANDLE

[76] Inventors: Howard Langlie; Albert T. Berg, Jr., both of Ellendale, Minn. 56026

[21] Appl. No.: 831,734

[22] Filed: Sep. 9, 1977

[51] Int. Cl.² .............................................. A01D 7/00
[52] U.S. Cl. .................................. 56/400.01; 403/361
[58] Field of Search ................. 56/400.01; 294/57; 403/359, 356, 319, 315, 322, 361

[56] References Cited

U.S. PATENT DOCUMENTS

| | | | |
|---|---|---|---|
| 986,761 | 3/1911 | Roscoe | 403/361 |
| 2,322,947 | 6/1943 | Litwin et al. | 403/361 |
| 2,610,875 | 9/1952 | Wheelden | 403/322 |
| 2,761,713 | 9/1956 | Schulze | 403/359 |
| 2,864,967 | 12/1958 | Redick et al. | 403/361 |
| 3,177,026 | 4/1965 | Cowan | 294/57 |
| 3,256,031 | 6/1966 | Fillweber | 403/359 |
| 3,436,106 | 4/1969 | Luenberger | 403/356 |
| 3,851,984 | 12/1974 | Crippa | 403/322 |
| 3,871,786 | 3/1975 | Rennerfelt | 403/359 |
| 3,927,435 | 12/1975 | Moret et al. | 403/322 |
| 4,078,368 | 3/1978 | Binder | 56/400.01 |
| 4,089,612 | 5/1978 | Mazzeo | 403/359 |

*Primary Examiner*—Jay N. Eskovitz
*Attorney, Agent, or Firm*—Peterson, Palmatier, Sturm & Sjoquist, Ltd.

[57] ABSTRACT

The hand tool in the exemplary situation constitutes a plastic rake head and a readily removable wooden handle. To assure retention of the handle, a chordal groove or transverse notch is provided near one end thereof, and the sleeve or socket portion of the rake into which the end of the handle is inserted is provided with a latch mechanism which includes a resilient tongue on the free end of which is carried a dog biased into the groove or notch through an opening in the sleeve so as to releasably latch the handle to the rake head. To prevent twisting of the handle, the bore of the sleeve is formed with a longitudinal key and a keyway is formed in the end portion of the wooden handle. The bore or socket curves inwardly at two angularly spaced locations, one to either side of the longitudinal key, to form resilient ribs having sawtooth splines thereon engageable with the inserted end portion of the handle, there being a slit near one end of such rib so that the ribs can more readily be flexed outwardly to firmly hold handles of somewhat differing diameters, assisted by flat surface ribs located diametrically opposite the ribs with the splines thereon. Various tools of different sizes and types can be substituted one for the other; yet, only a single handle is required.

11 Claims, 12 Drawing Figures

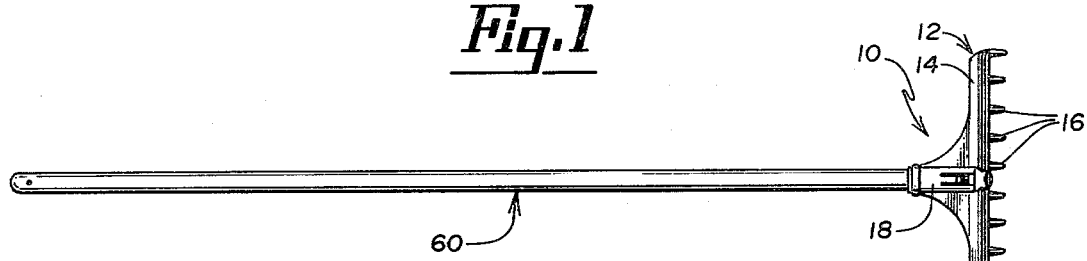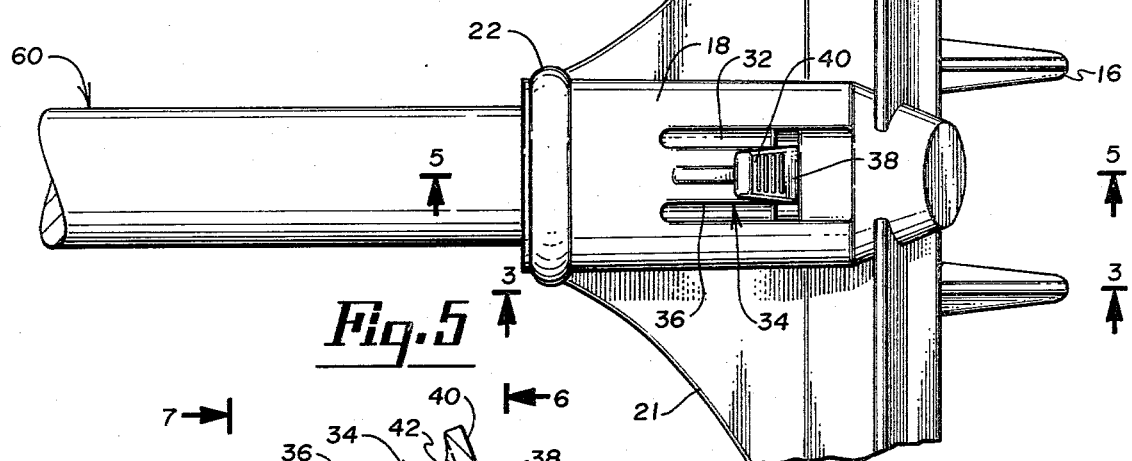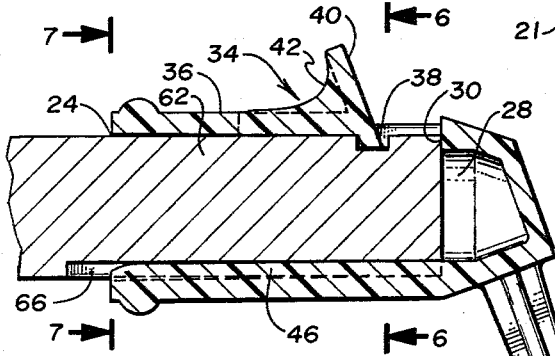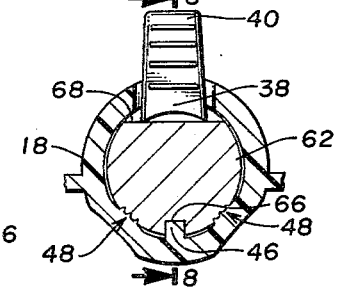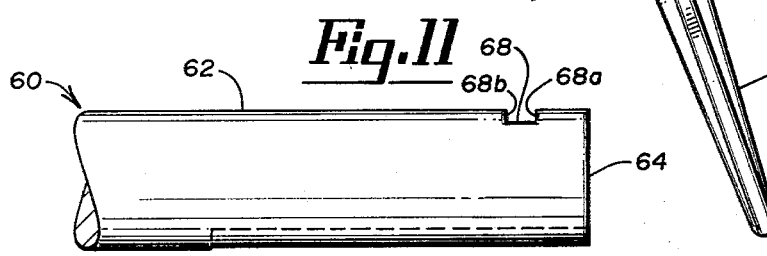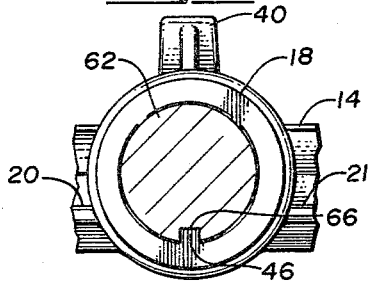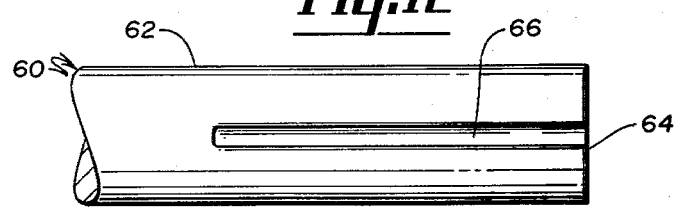

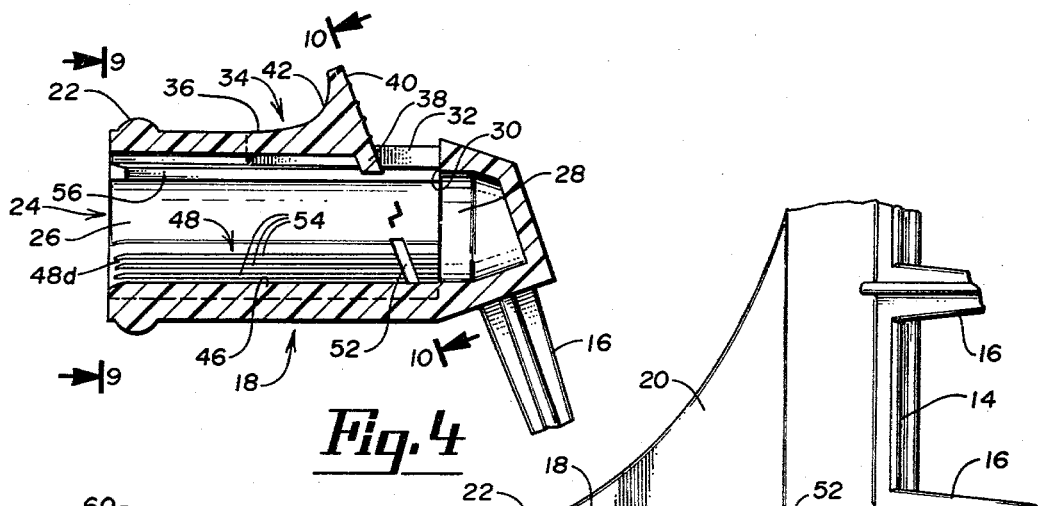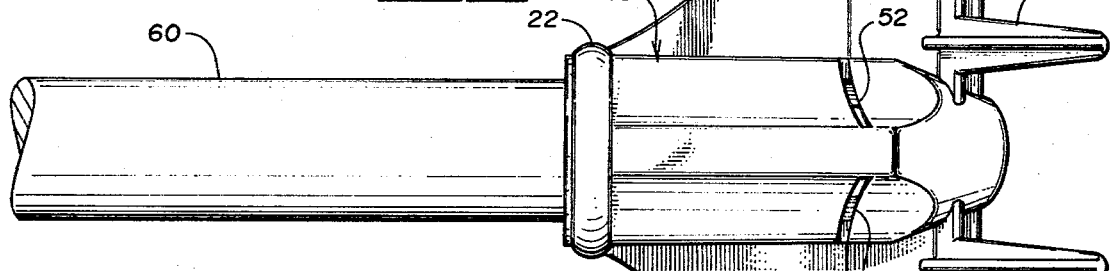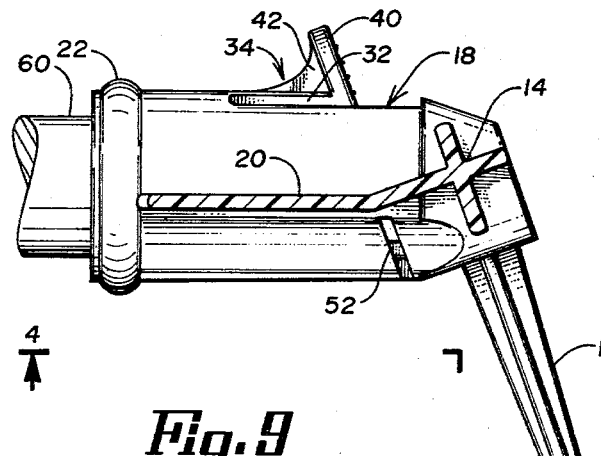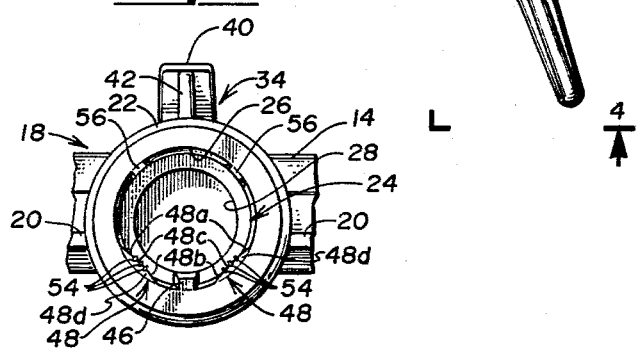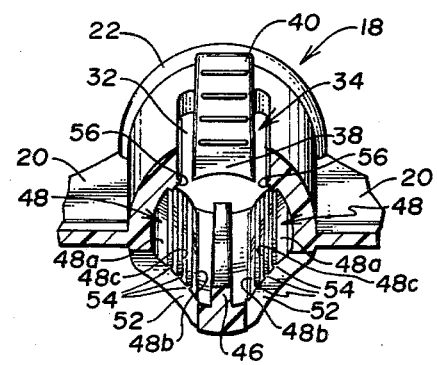

HAND TOOL WITH READILY DETACHABLE HANDLE

BACKGROUND OF THE INVENTION

1. Field of the Invention

This invention relates generally to hand tools utilizing elongated wooden handles, and pertains more particularly to an implement in which the handle can be readily attached and detached.

2. Description of the Prior Art

One rather common way of attaching wooden handles to hand tools, particularly those of the garden variety, is to taper one end of the wooden handle so that it can be forced or pressed into a socket or bore provided in the tool. With such an arrangement, the handle can quite easily work itself loose from the tool, so a nail hole is frequently provided in the wall of the socket portion and a nail driven through the hole furnishes a more reliable and permanent mode of attachment.

Another way of holding a tool in place on a handle is to form threads within the bore or socket and on the end of the handle. This is a more costly manufacturing technique, and the handle still works itself loose without some added means of securement.

SUMMARY OF THE INVENTION

Accordingly, an object of the present invention is to provide a hand tool to which an elongated wooden handle can be readily attached and detached. More specifically, an aim of the invention is to permit both the attachment and detachment to be effected without having to resort to accessory tools or implements, such as hammers or screwdrivers, and without having to employ any auxiliary fastening means, such as nails or screws.

Another object is to permit various types and sizes of tools to be substituted one for the other when using only one handle.

A further object of the invention is to provide a positive means of connecting a handle to a tool, thereby assuring that the handle will not become inadvertently detached during use.

A still further object of the invention is to provide a tool and handle in which the handle will be firmly held or anchored and will not wobble or become loose.

Another object is to provide a tool and handle in which the handle can be quickly removed to save space when the tool is stored and not in use.

Additionally, owing to the easy attachment made possible when practicing our invention, another object is to effect a saving in packaging and freight when shipping tools and handles of the envisaged type from the factory, for the handle and the tool (or tools) to be used therewith can be packed more compactly with the handle detached.

Still further, an object is to provide a tool or implement head that lends itself readily to being made of plastic and which does not require close tolerances with respect to the elongated wooden handle to be used therewith. In this regard, an aim of the invention is to supply a wooden handle with a tool (or tools) equipped with a socket for receiving an end portion of the handle therein which will permit the handle to be held securely even though it may swell or contract with changes in humidity.

Yet another object of the invention is to provide a plastic tool or implement that can be inexpensively molded in one piece and still incorporate therein the detachable handle feature of the invention.

A further object is to provide for the facile attachment and detachment of a handle with respect to a tool or implement in which the attachment and detachment can be accomplished through the agency of an adaptor which is fastened to the tool and which provides the specially configured socket rather than having the socket integral with the tool itself. Consequently, our invention possesses considerable utility, particularly inasmuch as adaptors constructed in accordance with our invention can be fastened or secured to various tools. In this way, a single handle can be employed for the various tools equipped with such adaptors. Stated somewhat differently, the tools themselves need not have the specially configured sockets, for the adaptors can be fabricated with our unique socket incorporated therein.

Another object of the invention is to provide for an easy attachment and detachment of a handle to a tool and in which the configuration of the end portion of the handle to be attached to the tool is relatively simple. Consequently, should a handle become lost or broken, it is a relatively easy task to shape another handle for use with tools or adaptors having a socket configured in accordance with our invention.

Briefly, our invention makes use of a latch mechanism associated with a tubular sleeve or socket member so that when the end of the handle is inserted into the bore or socket, a latch mechanism associated with the sleeve or socket member which is composed of a resilient tongue having a dog thereon automatically engages the inserted handle. More specifically, the handle is formed with a transverse notch or groove into which the dog is biased to effect the latching engagement. The bore or socket receiving the end portion of the handle has a longitudinal key which fits into a complementally configured keyway formed on the handle. Whereas the key and keyway prevent twisting of the handle relative to the tool, any tendency for the handle to wobble is precluded by reason of angularly spaced ribs in the socket or bore which have inset surfaces with sawtooth splines thereon which pressurally bear against segmental portions of the handle. Flat ribs are diametrically located with respect to the toothed ribs so as to assist in the firm retention of the handle within the socket member. In this way, various sizes and types of tools can be substituted one for the other when using but a single handle.

BRIEF DESCRIPTION OF THE DRAWINGS

FIG. 1 is a top plan view of a garden tool, more specifically a rake, embodying our invention;

FIG. 2 is a greatly enlarged fragmentary view corresponding to FIG. 1;

FIG. 3 is a side elevational view of the sleeve or socket member, the view constituting a sectional view through the rake head in the direction of line 3—3 of FIG. 2;

FIG. 4 is a bottom plan view, the view being in the direction of line 4—4 in FIG. 3;

FIG. 5 is a sectional view taken in the direction of line 5—5 of FIG. 2;

FIG. 6 is a sectional view taken in the direction of line 6—6 of FIG. 5;

FIG. 7 is a sectional view taken in the direction of line 7—7 of FIG. 5;

FIG. 8 is a sectional view taken in the direction of line 8—8 of FIG. 6 but with the handle removed;

FIG. 9 is an end view taken from the left in FIG. 8, the view being in the direction of line 9—9;

FIG. 10 is a sectional view taken in the direction of line 10—10 of FIG. 8;

FIG. 11 is a side elevational view of the end portion of the handle which is received in the bore of the sleeve or socket member, and FIG. 12 is a bottom view corresponding to FIG. 11 for the purpose of showing the longitudinally disposed keyway.

DESCRIPTION OF THE PREFERRED EMBODIMENT

The tool selected to exemplify our invention has been denoted generally by the reference numeral 10. In this regard, it comprises a plastic rake head 12 and in the exemplary instance has an oppositely extending rib 14 to which are integrally attached any preferred number of tines 16.

Playing an important role in the practicing of our invention is a central sleeve or socket member 18 with flanking reinforcing webs 20, 21 and an annular rib 22. The annular rib 22 extends around a circular opening 24 leading into a bore or socket 26 within the sleeve or socket member 18. A recess 28 (FIGS. 5 and 8) of somewhat smaller cross section than the bore 26 forms a shoulder at 30. The sleeve or socket member 18 has a second opening 32, this opening having an elongated or rectangular configuration as can be discerned from FIG. 2. The left end of the opening 32 is spaced from the opening 24 and extends lengthwise of the sleeve or socket member 18.

As can best be understood from FIGS. 2, 5 and 8, the sleeve or socket member 18 has a latch mechanism denoted generally by the reference numeral 34. More specifically, the latch mechanism 34 includes a resilient tongue or shank 36 which is integrally connected to the end of the opening 32 nearer the opening 24. At the free end of the resilient tongue or shank 36 is a dog 38 (FIGS. 5 and 8) that is slanted or inclined slightly with respect to the longitudinal axis of the tongue 36, this being advantageous in the realization of the latching action still to be disclosed. The resilient tongue 36 biases the dog 38 into the bore or socket 26, doing so via the opening 32. The tongue 36 can be flexed upwardly and out of the socket 26, as viewed in FIGS. 5 and 8, by means of a thumb tab 40. Imparting reinforcement to the tab 40 is a gusset 42.

As perhaps best understood from FIGS. 6, 7 and 9, a longitudinal key 46 projects into the bore 26. Within the bore 26, and to either side of the key 46, are flexible ribs 48 having inwardly sloping side surfaces 48a, 48b and a central plateau or platform 48c (FIGS. 9 and 10). Additionally, the two ribs 48 are each formed with an inclined surface or ramp at 48d (FIGS. 8 and 9) adjacent the opening 24. In order to enhance the resiliency or flexibility of the ribs 48, which is made use of for a purpose presently to become manifest, each rib 48 has an angularly disposed slit 52 adjacent one end thereof, more specifically, the end nearer the recess 28 and shoulder 30. Several sawtooth splines 54 project inwardly from each plateau or platform 48c, these splines extending from the ramp 48d in each instance to the shoulder 30, although interrupted by the slits 52. Diametrically located opposite each of the ribs 48 is a rib 56, the ribs 56 having flat surfaces in contradistinction to the toothed surfaces on the ribs 48.

An elongated wooden handle has been indicated generally by the reference numeral 60. It includes a longitudinal end portion 62 that is receivable in the bore or socket 26 via the opening 24. The extremity of the end portion 62 is flat as indicated by the reference numeral 64.

As already indicated, the bore 26 is formed with a longitudinally directed key 46. The handle end portion 62 is formed with a complementally configured keyway 66 (FIG. 12). Still further, a chordal groove 68 is formed in the end portion 62 at a location spaced somewhat from the flat extremity 64. The groove 68 provides a transverse notch with shoulders at 68a and 68b.

Although the invention has been illustrated in conjunction with a rake head 12 as the tool 10, it will be appreciated that other appropriately structured tools can be attached to the handle 60 instead. It should be further recognized that rake heads 12 can vary in size. For instance, rake heads 12 intended for gathering leaves from lawns usually have a width of 22 inches. On the other hand, when the rake head 12 is to be used for raking gardens and the like, a width of 14 inches is quite common. Still further, in order to rake around hedges and bushes, a lesser width proves beneficial and heads 12 having a width of only 5 inches have been employed. Additionally, some tools 10 lend themselves readily to having the sleeve or socket member 18 fastened thereto rather than being integral therewith. Thus, the invention contemplates the inclusion of the sleeve or socket member 18 as part of an adaptor in lieu of having it molded integrally to the tool in a one-piece or unitary fashion as illustrated.

At any rate, it should be appreciated that only a single handle 60 is needed for various tool substitutions, and that even a tool of one type, such as the rake head 12 can be supplied in various sizes or widths. Consequently, inasmuch as wooden handles 60 can be relatively expensive, a purchaser can buy a whole set of hand tools 10, such as different rake heads 12, and need acquire but a single handle 60. On the other hand, the tool 10 can take the form of a number of other tools, such as hoes, spades or trowels, squeegees and the like, and yet only one handle 60 is needed.

Having presented the foregoing description, the manner in which the handle 60 is attached to and detached from the head 12 should be readily comprehendible. When attaching the handle 60, all that the user need do is to insert the end portion 62 into the bore 26. The user, however, should make certain that the handle 60 is oriented so as to align the keyway 66 with the rectangularly configured key 46. The user then forces the end portion 62 into the bore 26. The teeth-like engagement provided by the splines 54 on the two ribs 48 bear against the end portion 62 as it is progressively urged into the bore 26.

Whereas the end portion 62 is generally cylindrical, at times the diameter will vary with respect to the size of the bore 26, not only due to differences in forming the handle at the factory but also due to changes in humidity after purchase. At any rate, depending upon the diameter of the end portion 62, it will press against the ribs 48, more specifically their sawtooth splines 54, and will flex these ribs outwardly in accordance with the size of the end portion 62, the other side of the end portion 62 reacting against the diametrically disposed flat surface ribs 56. The slits 52 formed through the ribs 48 at the ends thereof nearer the recess 28 and shoulder 30 enable the flexing action to occur more readily. The result is that the handle 60 is securely, yet releasably, gripped.

Due to the slant or inclination of the dog 38 the flat extremity 64 overcomes the inherent biasing action of the tongue 36 so as to flex the dog 38 outwardly with respect to the opening 32. However, once the chordal groove or notch 68 is moved into registry with the dog 38, the inherent resiliency of the tongue 36 snaps the dog 38 into the groove or notch 68. While the flat extremity 64 is depicted in FIG. 5 as bearing against the shoulder 30, there can be some clearance between the flat 64 and the shoulder 30. In any event, the distance between the flat 64 and the notch 68, quite obviously, should not be so great as to prevent the dog 38 from entering the notch.

It should now be evident that any attempt to withdraw the handle 60 from the bore or socket 26 is precluded by virtue of the dog 38 engaging the shoulder 68a which forms one side of the notch or groove 68. Stated somewhat differently, the handle 60 becomes latched or locked to the head 12. Also, it will be recognized that since the handle 60 is of wood, more specifically ash in most instances, the sawtooth splines 54 and the ribs 48 on which they are formed assure that there will be little likelihood of any wobbling of the handle portion 62 within the bore 26, the resulting press fit between the splines 54 and the end portion 62 preventing such a happening. The ribs 48, of course, can flex outwardly only within limits to accommodate different handle diameters or cross sections, but still there is an acceptance of handles over a practical tolerance range without any significant sacrifice in the firmness with which the handle 60 is retained. Furthermore, the employment of the longitudinal key 46, which extends radially into the bore 26, and the complementally configured keyway 66 positively prevent any rotation of the handle 60 with respect to the head 12.

Hence, the handle 60 cannot be withdrawn from the head 12, because of the latching produced by the dog 38 and the groove or notch 68, more specifically the shoulder 68a, until a deliberate release of the handle 60 is undertaken. When the handle 60 is to be removed or detached, then the user need only press against the tab 40 to raise the dog 38 from the groove or notch 68 and thus effect release of the handle. While there is a snug or press fit existing by reason of the flexible ribs 48 and their splines 54, the user can easily withdraw the end portion 62 from the bore or socket 26 by exerting a sufficient pull on the handle 60. In other words, the handle 60 when the thumb tab 40 is actuated unlatches the mechanism 34 so that the handle 60 can be retracted from the bore 26.

It should be appreciated that, when attached to the handle 60, the rake head 12 extends transversely or perpendicularly to either side of the handle 60. However, when detached, the rake head 12 can be placed parallel to the handle 60 during shipping or storage. Also, additional heads 12, say of different size, or other tools can be similarly packed or subsequently stored when not being used. Owing to the manner in which the latch mechanism 34 is constructed, tools embodying our invention lend themselves readily to being molded of plastic, such as linear polyethylene, and in one piece. Therefore, a number of practical advantages can be realized when incorporating our invention directly into the design of a hand tool or into an adaptor therefor.

We claim:
1. In combination with a hand tool, means forming a generally cylindrical socket connected to said tool, said means having an opening at one end for permitting the insertion of a generally cylindrical end portion of an elongated handle into said socket and a plurality of resilient sawtooth splines integral with said means, said sawtooth splines projecting into said socket for flexibly and releasably engaging a segmental surface of the cylindrical end portion of a handle, said socket means including at least one inwardly curving resilient longitudinal rib extending into said socket and said plurality of sawtooth splines being on said rib.

2. The combination of claim 1 including a second inwardly curving resilient longitudinal rib extending into said socket, said second rib also having a plurality of sawtooth splines thereon and being angularly spaced from said first rib.

3. The combination of claim 1 including additional longitudinal ribs extending into said socket from opposite angularly spaced locations from said first and second ribs.

4. The combination of claim 3 including a longitudinal key disposed between said first and second ribs.

5. The combination of claim 4 including an elongated handle having a longitudinal keyway therein for receiving said key.

6. The combination of claim 1 in which said angularly spaced ribs have slits extending angularly with respect to the longitudinal axes thereof, said slits being located near the ends of said ribs remote from said opening.

7. The combination of claim 6 including a longitudinal key opposite said second opening and in which said angularly spaced ribs are nearer said key than said second opening.

8. The combination of claim 7 including additional longitudinal ribs extending into said socket from locations nearer said second opening and opposite said angularly spaced ribs, said additional ribs having flat surfaces facing the sawtooth splines on said angularly spaced ribs.

9. The combination of claim 6 in which said first and second ribs have inclined surfaces or ramps adjacent said opening.

10. In combination with a hand tool, plastic means connected to said tool including a sleeve forming a generally cylindrical socket having an opening at one end for permitting the insertion of a generally cylindrical end portion of an elongated wooden handle into said socket having substantially the same cross section as said socket, said plastic means having a pair of angularly spaced longitudinal ribs formed with an arcuate cross section curving inwardly into said socket from a location near said opening and said longitudinal ribs each having a plurality of sawtooth splines integrally formed thereon, said angularly spaced ribs having slits extending angularly with respect to the longitudinal axes thereof located near the ends of said ribs remote from said opening, said slits rendering said ribs and said sawtooth splines flexible and resilient so that said sawtooth splines and said ribs will flex outwardly when said generally cylindrical end portion of said elongated handle is inserted into said socket.

11. In combination with a hand tool, an elongated wooden handle having a generally cylindrical end portion, means forming a generally cylindrical socket connected to said tool, said socket means having an opening at one end through which said generally cylindrical end portion of said elongated handle is received into said socket and a plurality of resilient sawtooth splines integral with said means, said sawtooth splines projecting into said socket for flexibly and releasably engaging a segmental surface of the cylindrical end portion of said wooden handle, said socket means having a second opening angularly spaced from said resilient sawtooth splines which is elongated and extends axially with respect to said socket and said splines, and latch means including a resilient tongue attached at one end to said socket means and a dog carried at the other end of said tongue extending into said socket via said second opening, said one end of said tongue being attached to said socket means adjacent the end of said second opening which is nearer said first opening, said socket means and said latch means being of one-piece plastic construction, and said cylindrical end portion of said handle having a transverse notch into which said dog extends to retain said handle end portion within said socket.

* * * * *